(12) United States Patent
Zesar et al.

(10) Patent No.: US 12,340,276 B2
(45) Date of Patent: Jun. 24, 2025

(54) DEVICE FOR CONTROLLING TRAPPED IONS WITH LOW HEAT DISSIPATION

(71) Applicant: Infineon Technologies Austria AG, Villach (AT)

(72) Inventors: Alexander Zesar, Villach (AT); Silke Katharina Auchter, Villach (AT); Matthias German Dietl, Villach (AT); Peter Oles, Villach (AT); Lina Purwin, Villach (AT); Clemens Rössler, Villach (AT); Helmut Heinrich Schoenherr, Villach (AT)

(73) Assignee: Infineon Technologies Austria AG, Villach (AT)

( * ) Notice: Subject to any disclaimer, the term of this patent is extended or adjusted under 35 U.S.C. 154(b) by 457 days.

(21) Appl. No.: 17/953,455

(22) Filed: Sep. 27, 2022

(65) Prior Publication Data
US 2023/0094771 A1    Mar. 30, 2023

(30) Foreign Application Priority Data
Sep. 30, 2021    (EP) .................................... 21200168

(51) Int. Cl.
*G06N 10/40*    (2022.01)
*G21K 1/00*    (2006.01)

(52) U.S. Cl.
CPC ............. *G06N 10/40* (2022.01); *G21K 1/003* (2013.01)

(58) Field of Classification Search
CPC ............................... G06N 10/40; G21K 1/003
See application file for complete search history.

(56) References Cited

U.S. PATENT DOCUMENTS

| | | |
|---|---|---|
| 7,154,088 B1 | 12/2006 | Blain et al. |
| 10,984,976 B1 | 4/2021 | Nordquist et al. |
| 2023/0102515 A1* | 3/2023 | Purwin ................ G06N 10/40 250/489 |

OTHER PUBLICATIONS

Bautista-Salvador A., et al., "Multilayer ion trap technology for scalable quantum computing and quantum simulation", New Journal of Physics, vol. 21, Dec. 6, 2018, pp. 1-11.
(Continued)

*Primary Examiner* — Nicole M Ippolito
(74) *Attorney, Agent, or Firm* — Murphy, Bilak & Homiller, PLLC

(57) ABSTRACT

A device for controlling trapped ions includes a substrate. A first metal layer is disposed over the substrate. An insulating layer is disposed over the first metal layer. A structured second metal layer is disposed over the insulating layer. The structured second metal layer includes an electrode of an ion trap configured to trap ions in a space above the structured second metal layer. The electrode of the structured second metal layer and the first metal layer overlap each other. The device further includes a void space in the insulating layer between the first metal layer and the electrode of the structured second metal layer, the void space including a vacuum at least during operation of the device.

18 Claims, 5 Drawing Sheets

(56) References Cited

OTHER PUBLICATIONS

Maunz, Peter, et al., "Sandia Micro-fabricated Ion Traps for the MUSIQC architecture", Sandia National Laboratories, Aug. 23, 2013, pp. 1-23.

Ragg, Simon, et al., "Segmented ion-trap fabrication using high precision stacked wafers", arXiv:1907.05329 [physics.app-ph]; https://doi.org/10.48550/arXiv.1907.05329, Jul. 12, 2019, pp. 1-11.

Strick, D, et al., "Demonstration of a microfabricated surface electrode ion trap", Cornell University Library, arXiv:Instrumentation and Detectors, Aug. 5, 2010.

* cited by examiner

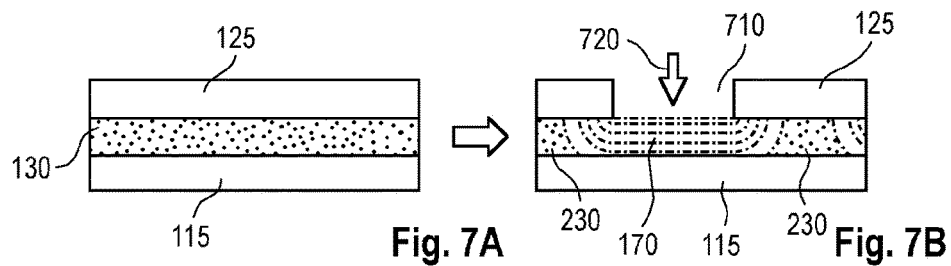
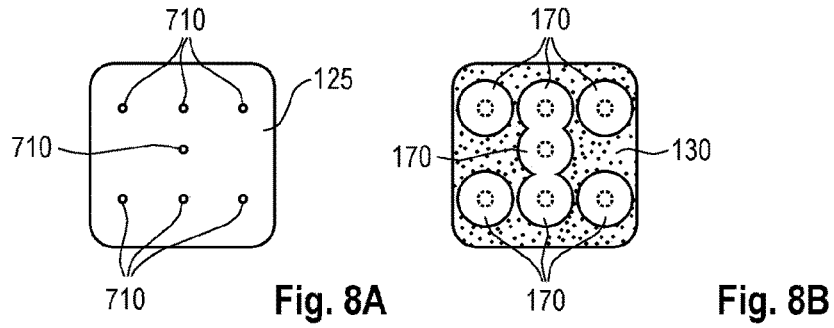
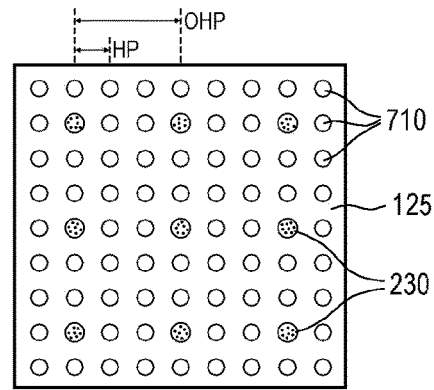
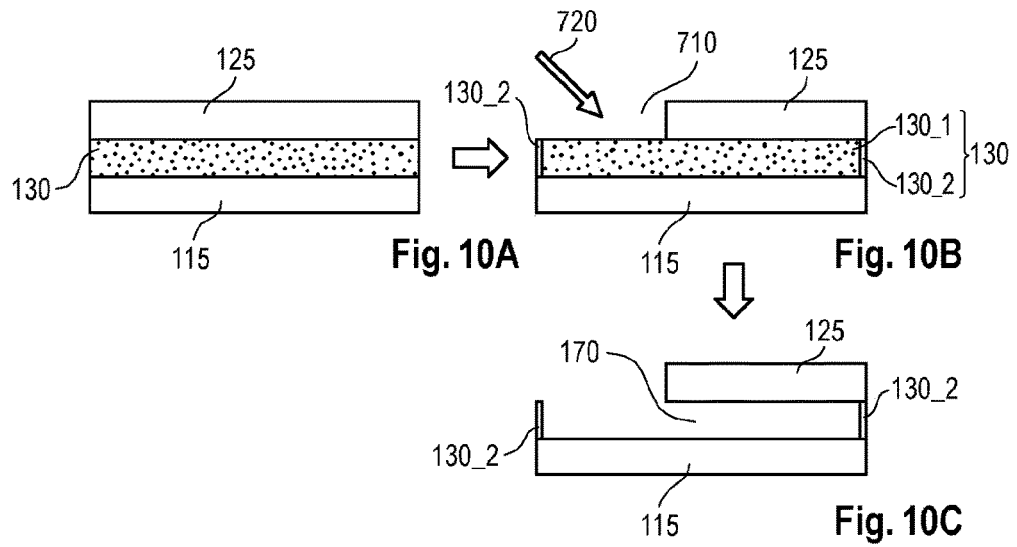

DEVICE FOR CONTROLLING TRAPPED IONS WITH LOW HEAT DISSIPATION

TECHNICAL FIELD

This disclosure relates generally to the field of ion traps, and in particular to ion traps for quantum computing and methods of manufacturing such devices.

BACKGROUND

Trapped ions are one of the most promising candidates for use as qubits (quantum bits) in quantum computers since they can be trapped with long lifetimes in a scalable array by virtue of electromagnetic fields. Presently, the most advanced ion traps can control about 50 qubits individually and can maintain up to 16 qubits in a fully entangled state. Future quantum computers will need to increase the number of controllable qubits to more than 100 or even 1000 to outperform classical supercomputers. Further, the number of ions used for each qubit will in future be raised to about 6 to 100 ions in order to allow for more efficient error-correction during quantum computing.

With increasing the number of ions, the area requirement for devices for controlling trapped ions such as, e.g., quantum computing devices increases. Assuming a mean distance between neighboring ions of 10 to 100 μm and a number of 10000 ions, the total required area may be as large as 100 $cm^2$ to 1 $m^2$. Hence, increasing the number of simultaneously trapped ions while maintaining the ability to control and measure them individually is one of the main challenges in controlling trapped ions and, in particular, in progressing to practical quantum computing.

Individual ions are trapped in an alternating electromagnetic field generated by DC and RF voltages across the ion trap electrodes. To minimize the interference on the ions, the ion traps are operated in a cryostat at low temperatures in an ultra-high vacuum. A problem that generally arises, and especially when the number of ions is increased, is that the required high RF voltages cause dielectric losses in dielectric layers on which the electrodes are placed. These dielectric losses cause the ion trap to heat. The associated temperature rise in the cryostat reduces the performance of the ion trap and would prevent an upscaling to higher qubit or ion numbers.

Further, since the ion trap may have a metal multilayer structure in which a lower metal layer is located below the electrode metal layer and is spaced apart from the electrode by a dielectric layer, the dielectric material between the electrode and the lower metal layer affects the capacitance generated between the electrode and the lower metal layer. The higher the capacitance the more charging currents flow, which are accompanied by corresponding ohmic losses in the supply lines and thus additional heating.

A further problem which might arise because of the geometric capacitances between RF lines and DC electrodes is a risk for crosstalk, which modulates an unwanted RF component onto the DC electrodes.

SUMMARY

According to an aspect of the disclosure, a device for controlling trapped ions includes a substrate. A first metal layer is disposed over the substrate. An insulating layer is disposed over the first metal layer. A structured second metal layer is disposed over the insulating layer. The structured second metal layer comprises an electrode of an ion trap configured to trap ions in a space above the structured second metal layer. The electrode of the structured second metal layer and the first metal layer overlap each other. The device further includes a void space in the insulating layer between the first metal layer and the electrode of the structured second metal layer, the void space comprising a vacuum at least during operation of the device.

According to another aspect of the disclosure, a method of manufacturing a device for controlling trapped ions comprises providing a substrate. A first metal layer is formed over the substrate. An insulating layer is formed over the first metal layer and a structured second metal layer is formed over the insulating layer. The structured second metal layer comprises an electrode of an ion trap configured to trap ions in a space above the structured second metal layer. The electrode of the structured second metal layer and the first metal layer overlap each other. A void space is formed in the insulating layer between the first metal layer and the electrode of the structured second metal layer, the void space comprising a vacuum at least during operation of the device.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other and/or can be selectively omitted if not described to be necessarily required. Embodiments are depicted in the drawings and are exemplarily detailed in the description which follows.

FIGS. 7A-7B are schematic cross-sectional views illustrating stages of manufacturing a void space in an insulating layer between an electrode of the structured second metal layer and the first metal layer according to a first example.

FIG. 8A is a schematic top partial view of an exemplary electrode of the structured second metal layer.

FIG. 8B is a schematic top partial view of an exemplary insulating layer and a support structure formed out of the insulating layer.

FIG. 9 is a schematic bottom view of a portion of an exemplary electrode of the structured second metal layer showing a support structure formed by an array of pillars and a plurality of holes formed in the electrode.

FIGS. 10A-10C are schematic cross-sectional views illustrating stages of manufacturing a void space between an electrode of the structured second metal layer and the first metal layer according to a second example.

DETAILED DESCRIPTION

The words "over" or "on" or "beneath" with regard to a part, element or material layer formed or located or disposed or arranged or placed "over" or "on" or "beneath" a surface may be used herein to mean that the part, element or material layer be located (e.g. placed, formed, arranged, disposed, placed, etc.) "directly on" or "directly under", e.g. in direct contact with, the implied surface. The word "over" or "on" or "beneath" used with regard to a part, element or material layer formed or located or disposed or arranged or placed "over" or "on" or "beneath" a surface may, however, either be used herein to mean that the part, element or material layer be located (e.g. placed, formed, arranged, deposited, etc.) "indirectly on" or "indirectly under" the implied surface, with one or more additional parts, elements or layers being arranged between the implied surface and the part, element or material layer.

Figure 1:
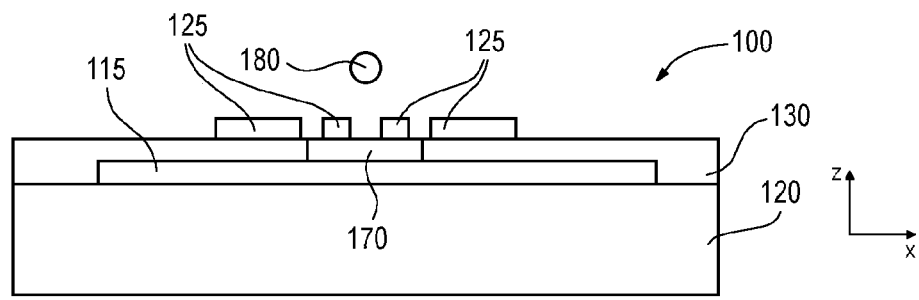
FIG. 1 is a schematic cross-sectional view of an exemplary device for controlling trapped ions.

Referring to FIG. 1, a device 100 for controlling trapped ions may include a substrate 120 and a first metal layer 115 disposed over the substrate 120. The device 100 further includes an insulating layer 130 disposed over the first metal layer 115 and a structured second metal layer 125 disposed over the insulating layer 130.

The structured second metal layer 125 forms electrodes of an ion trap configured to trap one or a plurality of ions 180 in a space above the structured second metal layer 125 (only one ion 180 is illustrated in FIG. 1 for ease of illustration).

The location of the ions 180 can be controlled by the one or more ion traps by virtue of electrical voltages applied to the structured second metal layer 125. For instance, the ions 180 can be moved in the space in one or more lateral directions (e.g. in the X-direction or in the Y-direction (see e.g. FIG. 3) or in any direction lying in a plane which is normal to the Z-direction) by virtue of AC and DC voltages separately coupled to specific electrodes of the structured second metal layer 125.

In some examples, the structured second metal layer 125 and thus the electrodes of the ion trap(s) are fabricated by micro-fabrication techniques. The substrate 120 may be substantially planar. The Z-direction may represent the height dimension of the device 100. The X-direction and the Y-direction are perpendicular to each other and define a plane in the width and length direction of the device 100, which is normal to the Z-direction.

In FIG. 1, the ion trap of the device 100 is exemplified to be designed as a so-called "surface-electrode" ion trap. In surface-electrode ion traps all electrodes (i.e. DC electrodes and RF electrodes) are contained in a single plane. Such two-dimensional ion trap geometries provide for high scalability. As will be described further below, in other embodiments the device 100 for controlling trapped ions may use three-dimensional ion trap geometry, see e.g. FIG. 5.

In the examples disclosed herein the structured second metal layer 125 may include RF electrodes for RF trapping and DC electrodes for static electric-field trapping. An ion trap disclosed herein can trap many ions 180 that may be individually addressable and movable by appropriately controlling the potentials of the electrodes of the ion trap(s).

The first metal layer 115 may, e.g., be a continuous shielding layer.

In other examples, the first metal layer 115 may be a structured metal layer. In this case, the structured first metal layer 115 may be used as an electrical wiring layer.

As shown in FIG. 1, one or more electrodes formed by the structured second metal layer 125 overlap with the first metal layer 115. A void space 170 is formed in the insulating layer 130 between the first metal layer 115 and the electrode(s) of the structured second metal layer 125 within an overlapping region. The overlapping of the structured first and second metal layers in a vertical projection may be formed by a crossing of the one or more electrodes of the second metal layer 125 with electrical contact lines in the first metal layer 115 or lower metal layer(s).

The void space 170 is configured to comprise a vacuum at least during operation of the device 100. The void space 170 allows to minimize the heat dissipation in the device 100 for controlling trapped ions during operation. First, dielectric losses are reduced or avoided because there is no or very little dielectric material between the electrode(s) of the structured second metal layer 125 and the first metal layer 115. Second, the capacitance of the capacitor formed by the electrode(s) of the structured second metal layer 125 and the first metal layer 115 is significantly reduced, because the dielectric constant of vacuum ($\varepsilon_r=1$) is much lower than the dielectric constant of the dielectric material of the insulating layer 130 (for instance, amorphous silicon oxide has a dielectric constant $\varepsilon_r=3.9$). The reduction in capacitance results in a significant reduction in charging currents and thus ohmic losses in the electrical interconnect during operation of the device 100. Further, the dielectric losses and the risk of crosstalk, which modulates an unwanted RF component onto the DC electrodes, are significantly reduced because of the lower dielectric constant of vacuum.

In other words, by removing a significant amount of dielectric material in the plate capacitor formed by the electrodes of the structured second metal layer 125 and the first metal layer 115, capacitance, dielectric losses and crosstalk are minimized, resulting in improved low temperature performance of the device in a cryostat.

In particular, the void space 170 may be formed below RF electrodes of the structured second metal layer 125. RF electrodes may be operated with high RF voltages of about 200 V or more at frequencies in the MHz region (e.g. 30 MHz).

In all examples described herein, the distance between the electrode(s) of the second metal layer 125 and the first metal layer 115 may, e.g., be in a range between 1 and 20 μm, in particular between 1 and 10 μm. More in particular, the distance may be in a range between 1.5 μm and 4 μm. The void space 170 may have a height with the same dimensions.

Figure 2A:
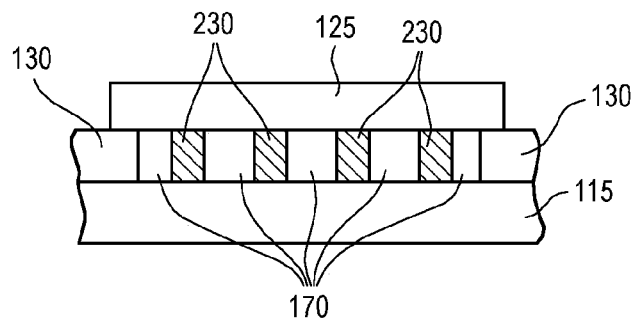
FIG. 2A is a schematic cross-sectional partial view of an exemplary device illustrating a support structure arranged in a void space.
Figure 2B:
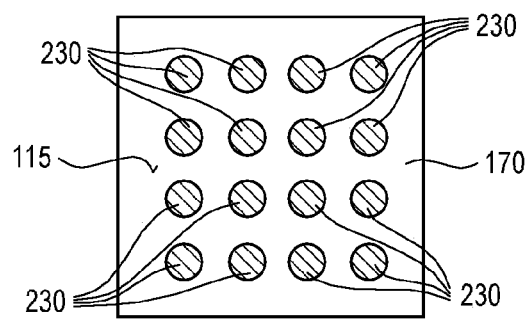
FIG. 2B is a schematic top partial view of the first metal layer and the exemplary support structure of FIG. 2A.

Referring to FIGS. 2A and 2B, a support structure may be arranged in the void space 170 for supporting the structured second metal layer 125. The support structure allows to stabilize the electrode in its unsupported area above the void space 170. That way, the mechanical stability of the electrode and the protection against deflection of the electrode, especially with regard to the displacement of the electrode due to DC voltage and/or with regard to the AC voltage operation, are improved.

The support structure may comprise an array of pillars 230. As will be described further below in greater detail, both the void space 170 and/or the pillars 230 may be fabricated by various different processes. The following description applies to all examples of manufacturing the void space 170 and/or the support structure.

It has been found that a pitch of 20 μm to 50 μm of the pillars 230 significantly increase the positional stability of the electrode. The pillars 230 (which may have any shape such as, e.g. circular, polygonal, etc.) may have lateral dimensions (e.g. diameter) in a range between 2 μm and 10 μm. Different pillar arrangements, among them cubic and hexagonal arrangements, were tested. It was found that the fundamental oscillation frequency obtained with any such design was in the MHz range, with the displacement of the electrode being smaller than 25 nm (where a Cu electrode of 2 μm thickness was used). The fundamental oscillation frequency was tunable via the pitch (e.g. 20 μm to 50 μm) in a range between 4 MHz to 23 MHz.

In one example, the insulating layer 130 comprises a dielectric material, the void space 170 is formed in the dielectric material and the support structure (e.g. pillars 230) is of the dielectric material. An exemplary process of fabrication of such arrangement will be described further below in conjunction with FIGS. 6A-9.

In other examples the insulating layer 130 comprises a first dielectric material and a second dielectric material, the void space 170 is formed in the first dielectric material and the support structure (e.g. pillars 230) is formed of the second dielectric material. An exemplary method of fabricating such arrangement is described further below in conjunction with FIGS. 10A-10C. The first dielectric material and the second dielectric material are different. The first dielectric material (i.e. the material of the insulating layer 130) may, e.g., be silicon oxide while the second dielectric material (i.e. the material of the support structure) may, e.g., be silicon nitride.

In all examples disclosed herein the electrode of the structured second metal layer 125 may be an RF electrode of the ion trap.

Figure 3:
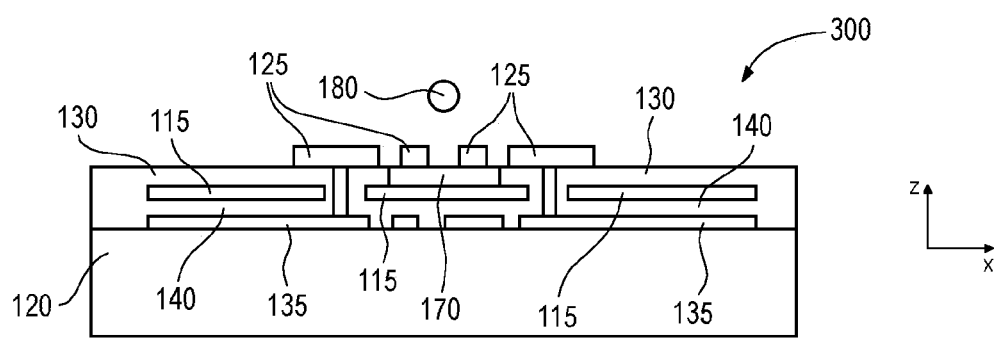
FIG. 3 is a schematic cross-sectional view of an exemplary device for controlling trapped ions having a multilayer micro-fabricated electrode structure.

Referring to FIG. 3, a device 300 for controlling trapped ions may have a multilayer micro-fabricated electrode structure. For instance, compared to the device 100, the device 300 may further comprise a structured further metal layer 135 disposed over the substrate 120 and a dielectric layer 140 disposed over the structured further metal layer 135 and beneath the first metal layer 115.

The structured further metal layer 135 may form a metal interconnect configured to electrically connect the electrodes of the structured second metal layer 125 to external circuitry. As shown in FIG. 3, the structured further metal layer 135 may be electrically connected to the electrodes of the structured second metal layer 125 by vias extending through the dielectric layers 130 and 140 and through openings in the first metal layer 115. That is, the structured further metal layer 135 may, e.g., be structured as an electrical wiring layer. This allows the formation of complex electrode structures and/or insular electrodes in the structured second metal layer 125. Further, a multilayer architecture of the device 300 for controlling trapped ions enhances scalability of the device 300.

The insulating layers 130, 140 may, e.g., be of silicon oxide or silicon nitride. They may be formed by micro-fabrication techniques, e.g. by plasma-CVD (chemical vapor deposition) or by thermal decomposition of tetraethyl orthosilicate (TEOS).

Figure 4:
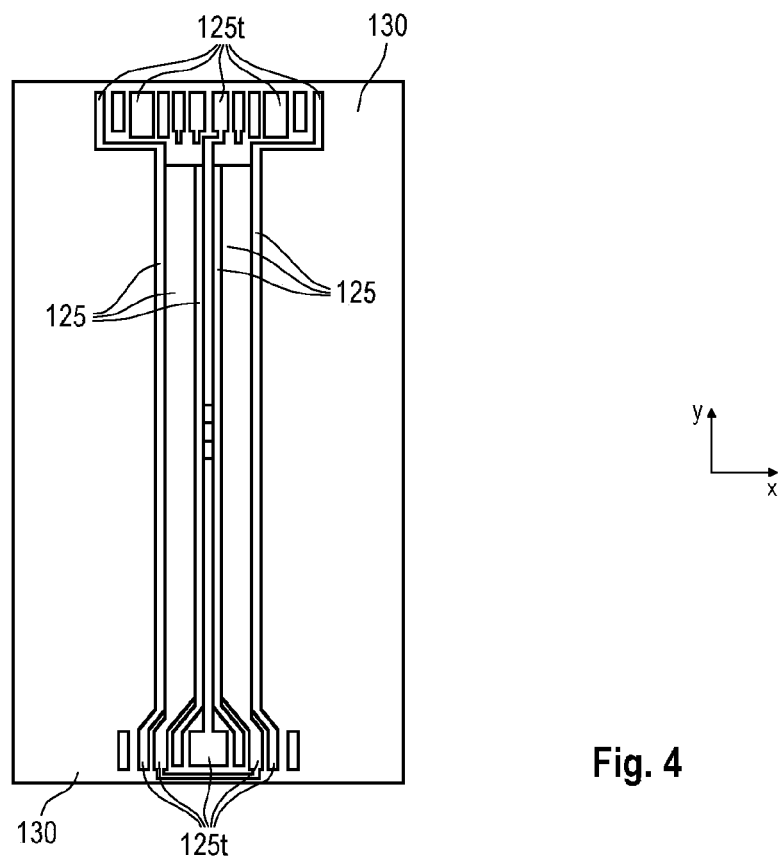
FIG. 4 is a top view of a substrate of an exemplary device for controlling trapped ions having a similar construction as the device for controlling trapped ions as shown in FIGS. 1 and 3.

FIG. 4 is a schematic top view of a simplified electrode structure formed in the structured second metal layer 125. Some of the electrodes are formed as stripe electrodes, while other electrodes may be formed as insular electrodes of small lateral dimensions. Many different electrode layouts are known in the art and could be used in the examples disclosed herein. The electrode layout provided by the structured second metal layer 125 may comprise Y-junctions and/or X-junctions (not shown) for ion shuttling.

FIG. 4 illustrates terminal lands 125$t$ of the structured second metal layer 125 available for electrically connecting the micro-fabricated electrode structure 125 including its RF and DC electrodes via connectors (not shown, e.g. wire bonds) to external circuitry (not shown). Other designs of electrical connections of the electrical interconnect (see e.g. FIG. 3) are also feasible. In other examples, the electrodes are not connected to terminal lands 125$t$ exposed at the substrate 120 but, e.g., to vias which directly connect to integrated circuitry (not shown) in the substrate 120.

Figure 5:
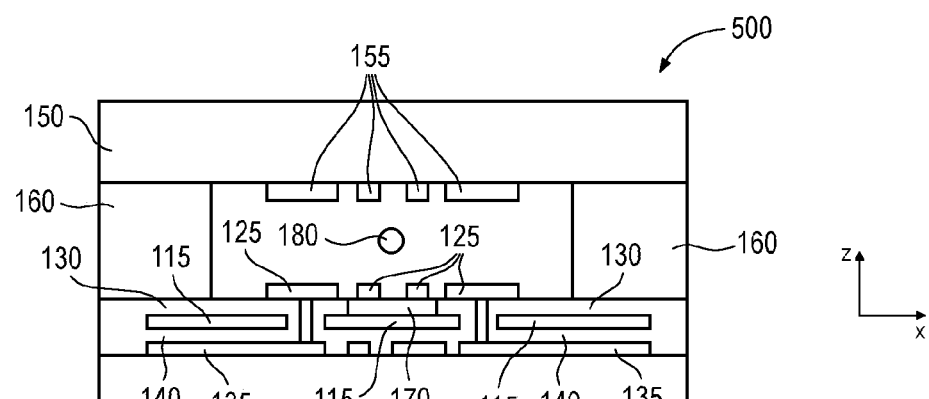
FIG. 5 is a schematic cross-sectional view of an exemplary device for controlling trapped ions having a multilayer micro-fabricated electrode structure and a further substrate disposed over and spaced apart from the substrate as shown in FIG. 3.

FIG. 5 illustrates a device 500 for controlling trapped ions which is implemented as a three-dimensional ion trap. Three-dimensional ion trap geometries such as, e.g., linear Paul trap(s) distinguish over the surface-electrode trap geometries (see e.g. FIGS. 1 and 3) by allowing substantially higher potential depths and higher trap frequencies. In linear traps, RF trapping is used in two dimensions while static electric-field trapping is used in the third dimension.

In the exemplary device 500 shown in FIG. 5, the ion(s) 180 are trapped between the substrate 120 and a further substrate 150 disposed over and spaced apart from the substrate 120. One or a plurality of spacer members 160 may be disposed between the substrate 120 and the further substrate 150.

The spacer members 160 define the spacing between the substrate 120 and the further substrate 150. The spacer members 160 may be bonded to the substrate 120 and/or to the further substrate 150 by wafer-bonding techniques. For instance, glass-bonding techniques or eutectic bonding techniques or anodic bonding techniques or thermocompression bonding techniques may be applied.

A structured third metal layer 155 is disposed at a main side of the further substrate 150 opposite the structured second metal layer 125. The structured third metal layer 155 forms electrodes of the (three-dimensional) ion trap. The ion trap is configured to trap ion(s) 180 in the space between the structured second metal layer 125 and the structured third metal layer 155.

The structured third metal layer 155 may also be formed by micro-fabrication techniques. Generally, micro-fabrication techniques for electrode formation and structuring may, e.g., involve photolithography methods (e.g. including photoresist application, patterning, etching) and/or deposition techniques (e.g. chemical vapor deposition (CVD), physical vapor deposition (PVD), sputtering) and/or plating techniques (e.g. electroless plating, galvanic plating) for applying insulating layers 130, 140 and metal layers 115, 125, 135, 155. Further, micro-fabrication techniques for electrode formation and structuring may include etching processes for structuring photoresist layers, insulating layers 130, 140 and metal layers 115, 125, 135, 155.

The structured third metal layer 155 may be electrically connected to external circuitry by an electrical interconnect (not shown) which may be similar to the electrical interconnect described above in the context of the substrate 120. In this respect, reference is made to the above description to avoid reiteration.

The electrodes formed in the structured second metal layer 125 and/or the structured third metal layer 155 may be structured with micrometer or sub-micrometer scale precision and alignment accuracy. This allows to achieve complex electrode layouts without loss of controllability of the trapped ions 180.

Figures 6A, 6B:
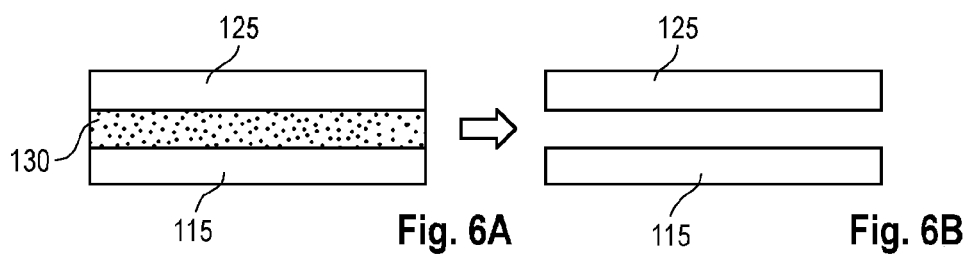
FIGS. 6A-6B are schematic cross-sectional views of an exemplary electrode of the structured second metal layer, the insulating layer and the first metal layer before and after forming a void space in the insulating layer according to one example.

Referring to FIGS. 6A-6B, the insulating layer 130 between the electrode (structured second metal layer 125) and the first metal layer 115 may be removed by etching. The overlapping area of the structured second metal layer 125 and the first metal layer 115 may have a size of, e.g., D1×D2. Typically, D1×D2 may be about 200 μm×200 μm, but other sizes in the ranges of D1 and/or D2 equal to or greater than or less than 20 μm, 50 μm, 100 μm, 200 μm, 300 μm or 400 μm are also possible. In this area the insulating layer 130 is completely or predominantly (e.g. with a volume percentage or an area percentage of equal to or greater than 80% or 90%) removed. Possible lateral dimensions of the void space 170 and dimensional ranges thereof may be equal to the overlap sizes/ranges recited above.

An etching process may be used to remove the insulating layer 130 where the void spaces 170 are to be created. The etchant can be applied to the insulating 130 by various different techniques. One possibility is to introduce the etchant laterally.

FIGS. 7A-7B, 8A-8B and 9 illustrate a process in which the void space 170 is created by an etch process through one or more holes 710 formed in the structured second metal layer 125. To this end, as shown in FIG. 7B, the structured second metal layer 125 is partially opened.

An etchant is then applied via the one or more holes 710 to the insulating layer 130 (e.g. a silicon oxide layer). The application of the etchant is indicated by the arrow 720. The material of the insulating layer 130 is subjected to e.g. isotropic etching. As shown in FIG. 7B, the structured second metal layer 125 is undercut by a certain length. The undercut length (or, differently stated, the overhang length of the structured second metal layer 125) can be controlled by the etching time.

As shown in FIG. 8A, a regular pattern of holes 710 may be provided in the structured second metal layer 125 in the region where the void space 170 is to be formed. That way, a plurality of void spaces 170 can be formed in the insulating layer 130. The void spaces 170 are aligned with the pattern of holes 710 in the structured second metal layer 125. By setting an appropriate etching time, the individual void spaces 170 may expand and unite. That way, the support structure (e.g. pillars 230) may be formed out of the insulating layer 130.

By increasing the number of holes 710 the overall etch time can be reduced. Further, the process of forming the support structure becomes less dependent on the etch rate.

As illustrated in FIGS. 8A, 8B, 9 a selective omission of holes in the pattern of holes 710 may be used to define those locations where the pillars 230 remain. Differently put, the support structure may be tuned by way of choosing an appropriate spacing between adjacent holes (hole pitch HP) and an appropriate spacing between adjacent omitted holes (omitted hole pitch OHP). The formation of a support structure including an array of individual pillars 230 may then be controlled by adjusting the etch time and the spacing of omitted holes OHP, taking into account the hole spacing HP.

The omitted hole pitch OHP, i.e. the pillar spacing, may, e.g., be equal to or greater than or less than 5 μm or 10 μm or 20 μm or 30 μm or 40 μm or 50 μm.

The void space 170 manufactured that way may be a continuous void space (with or without support structure) or may be composed of a number of individual void spaces each associated with one or a group of holes 710.

The void space 170 may be evacuated through the holes 710 during operation. In other examples, the void space 170 may be laterally evacuated during operation or may be a pre-evacuated, hermetically sealed structure.

Although not shown in FIGS. 7B-9, the holes 710 may alternatively or additionally be formed in the first metal layer 115. The creation of the void space 170 and/or the (optional) support structure including e.g. pillars 230 may then be performed in the same way as described above, and reference is made to the above description to avoid reiteration.

FIGS. 10A-10C illustrate another example of a process of forming a void space 170. In this example an etch stop wall is integrated in the insulating layer 130. To this end, as shown in FIG. 10B, the insulating layer 130 may comprise a first dielectric material 130_1 and a second dielectric material 130_2. The second dielectric material 130_2 may form the etch stop wall for defining the sidewall of the void space 170.

The first dielectric material 130_1 may be the dielectric material of which the insulating layer 130 is generally formed, e.g. silicon dioxide. The second dielectric material 130_2 may be integrated into the insulating layer 130 by a structuring process. The structuring process may have been performed on wafer level prior to the formation of the structured second metal layer 125.

The second dielectric material 130_2 may be structured in a cage-like fashion. That is, the second dielectric material 130_2 may enclose a region of the first dielectric material 130_1 between the structured second metal layer 125 and the first metal layer 115 that is to be etched away to form the void space 170.

Etching (see arrow 720) may again be performed via a hole 710 in the structured second metal layer 125. The first dielectric material 130_1 is selectively etchable against the second dielectric material 130_2 and the metal of the first metal layer 115 and the metal of the structured second metal layer 125. This process allows a complete and locally highly defined removal of the first dielectric material 130_1 in the target region where the void space 170 is to be formed.

Figure 11:
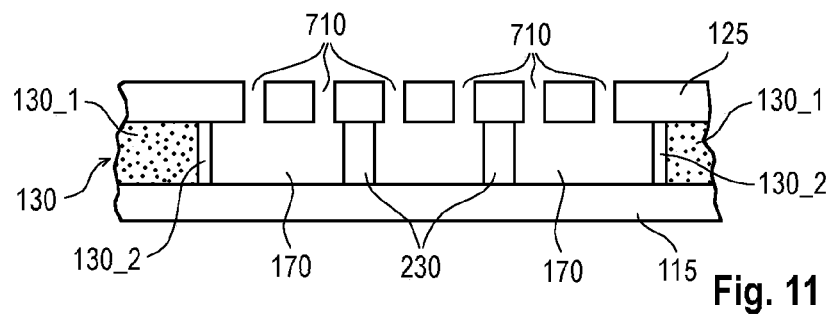
FIG. 11 is a schematic cross-sectional partial view illustrating a void space and a support structure manufactured in accordance with the process of FIGS. 10A-10C.

The process illustrated in FIGS. 10A-10C can also be used for the fabrication of a support structure within the void space 170. Referring to FIG. 11, the support structure is, e.g., implemented by pillars 230 made of the second dielectric material 130_2. Differently put, the insulating layer 130 is not only structured to define the etch stop sidewalls of the void space 170 but also to provide for the support structure within the void space 170. High positional precision and hence low manufacturing tolerances can be achieved both for the definition of the void space 170 and for the definition of the support structure (e.g. pillars 230). Again, the holes 710 may alternatively or additionally be arranged in the first metal layer 115 rather than in the structured second metal layer 125, if appropriate.

Figures 12A, 12B:
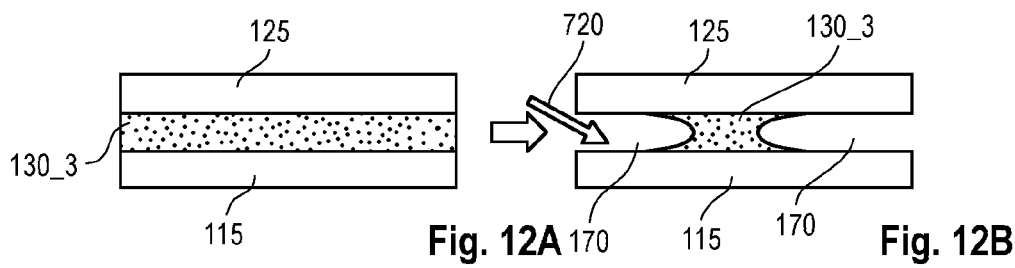
FIGS. 12A-12B are schematic cross-sectional views illustrating stages of manufacturing a void space between an electrode of the structured second metal layer and the first metal layer according to a third example.

FIGS. 12A-12B illustrate an example of manufacturing a void space 170 by using a sacrificial material 130_3 in the region where the void space 170 is to be generated. The sacrificial material 130_3, which is selectively etchable against the first dielectric material 130_1 of the insulating layer 130, serves as a placeholder for the void space 170. As an example, carbon can be used as sacrificial material 130_3. Similar to the process described above with reference to FIGS. 10A-10C, the sacrificial material 130_3 may be deposited by processes mentioned above in pre-structured areas of the insulating layer 130 during wafer processing.

Referring to FIG. 12B, the sacrificial material 130_3 is removed by selective etching (arrow 720 indicates the admission of the etchant). For instance, carbon can be etched with an oxygen plasma. The remaining first dielectric material 130_1 of the insulating layer (not shown), the metal of the first metal layer 115 and the metal of the structured second metal layer 125 remain untouched.

Here and in other examples the ion trap geometry may allow lateral access of the etchant from the side of the electrodes (e.g. RF electrodes) of the structured second metal layer 125. As the etching is extremely selective, high positional accuracy and reproducibility can be achieved. Further, similar as in the example illustrated in FIGS. 10A-11, etch time control or over-etching is not critical.

The concept of using a sacrificial material 130_3 can likely be used for simultaneously forming the void space 170 and a support structure for holding the electrode in place. In this respect, reference is made to FIG. 11 and the corresponding description, with the modification that the pillars 230 may be formed of the first dielectric material 130_1 (i.e. of the base material of the insulating layer 130) and that the sidewall etch stoppers of the second dielectric material 130_2 may be omitted. As in the process of FIGS. 10A-10C and FIG. 11, the holes 710 are no longer required for dimensioning and shaping the support structure, and therefore, a lateral application of the etchant is equally well possible.

Figures 13A, 13B:
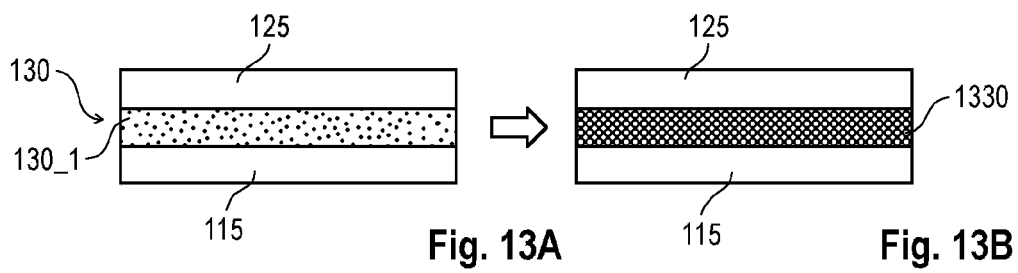
FIGS. 13A-13B are schematic cross-sectional views illustrating stages of manufacturing a void space between an electrode of the structured second metal layer and the first metal layer according to a fourth example.

Referring to FIGS. 13A and 13B, another possibility for forming a void space 170 together with a support structure is to use a porous material 1330 instead of the first dielectric material 130_1 of the insulating layer 130 in the region of the void space 170. In this case, no undercutting of the first metal layer 115 is required. Further, no etch processes after formation of the first metal layer 115 are needed. The porous material 1330 may be applied by diffuse introduction of vacuoles. To this end, similar as in the processes of FIGS. 10A-12B described above, the first dielectric material 130_1 of the insulating layer (i.e. the base material of the insulating layer 130) may be structured by the porous material 1330 before formation (e.g. deposition and structuring) of the structured second metal layer 125.

To improve the stability of the electrode, the structured second metal layer 125 may be formed of a multilayer stack, wherein the multilayer stack comprises an electrically conductive layer of a first material and a mechanical stabilization layer of a second material. In one example, the second material may have an elastic modulus greater than the elastic modulus of the first material. In a second example, the second material may have a yield strength greater than the yield strength of the first material. Both features may combine, i.e. the second material may have both an elastic modulus greater than the elastic modulus of the first material and a yield strength greater than the yield strength of the first material.

The second material may, e.g., comprise or be made of an electrically conductive material.

The first material may, e.g., be an AlSiCu alloy or an AlCu alloy. An exemplary AlSiCu alloy may have a chemical composition in percent by weight of 98.5% wt of Al, 1.0% wt of Si and 0.5% wt of Cu, balance incidental impurities. An exemplary AlCu alloy may have a chemical composition in percent by weight of 99.5% wt of Al and 0.5% wt of Cu, balance incidental impurities. These materials are widely used in microfabrication technology. In other examples, the first material may be of Cu or Au or Ag. The first material may include or be of any combination of the above-mentioned materials.

The second material may, e.g., be TiW or TiN or Pt or W or Pd or Ti. As to the alloy TiW, an exemplary chemical composition in percent by weight is 18 to 20% wt of Ti, the balance W and incidental impurities. TiN is a ceramic with high hardness which is known to be used as a barrier metal in microelectronics. Pt or W or Pd or Ti also have high hardness and are used for specific applications in microelectronics. All these materials have an elastic modulus greater than the elastic modulus of, e.g., AlSiCu alloy or AlCu alloy or Cu or Au or Ag. Further, all these materials have a yield strength greater than the yield strength of, e.g., AlSiCu alloy or AlCu alloy or Cu or Au or Ag.

Figure 14:
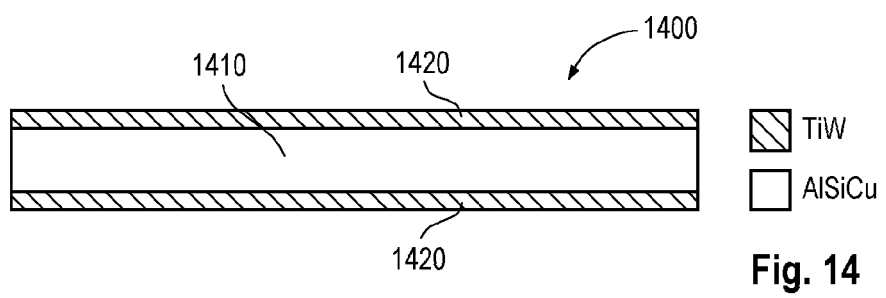
FIG. 14 is a schematic cross-sectional view of a multi-layer stack used for the electrode and comprising one single electrically conductive layer sandwiched between two mechanical stabilization layers.

Referring to FIG. 14, a multilayer stack 1400 may comprise one single electrically conductive layer 1410 sandwiched between two mechanical stabilization layers 1420. In FIG. 14, the single electrically conductive layer 1410 may be of AlSiCu alloy of the above-recited chemical composition, but other materials as mentioned above (e.g. AlCu alloy or Cu or Au or Ag) may also be used. The two mechanical stabilization layers 1420 are, in this example, of TiW alloy of the above-recited chemical composition, but other materials such as, e.g., TiN or Pt or W or Pd or Ti may also be used.

Further, throughout this disclosure, one or more adhesive layers (not shown) may optionally be disposed between the electrically conductive layer 1410 and the mechanical stabilization layer(s) 1420. For instance, Ti may be used as an adhesive layer material. The thickness of the adhesive layer (not shown) may be substantial smaller than the thickness of the electrically conductive layer 1410 and/or the thickness of the mechanical stabilization layer(s) 1420.

The electrically conductive layer 1410 may have a thickness in a range between 0.5 μm and 2.5 μm. The mechanical stabilization layers may have a thickness in a range between 100 nm and 400 nm.

In another example, the multilayer stack (not shown) may comprise one single electrically conductive layer 1410 and one single mechanical stabilization layer 1420. That is, only one of the two surfaces of the electrically conductive layer 1410 as shown in FIG. 14 is reinforced by the application of a mechanical stabilization layer 1420. Except this difference, the multilayer stack of this example may be identical to the multilayer stack 1400 of the example described above in conjunction with FIG. 14.

Figure 15:
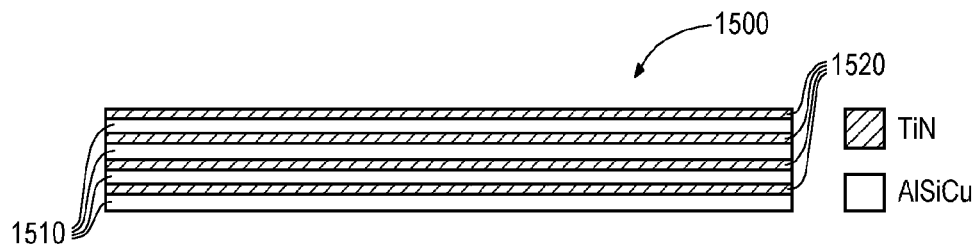
FIG. 15 is a schematic cross-sectional view of a multi-layer stack used for the electrode and comprising a plurality of electrically conductive layers and a plurality of mechanical stabilization layers stacked in alternating order.

FIG. 15 illustrates another example in which a multilayer stack 1500 comprises a plurality of electrically conductive layers 1510 and a plurality of mechanical stabilization layers 1520 stacked in alternating order.

In the example shown in FIG. 15, the electrically conductive layers 1510 are of AlSiCu alloy of the above-recited chemical composition and the mechanical stabilization layers 1520 are of TiN. As in the example of FIG. 14, however, the electrically conductive layers 1510 may alternatively be of one of the materials mentioned above for the electrically conductive layers 1410 and/or the mechanical stabilization layers 1520 may be of one of the materials mentioned above for the mechanical stabilization layers 1420. Further, one or more thin adhesive layers (not shown) as described above may be disposed between each electrically conductive layer 1510 and each mechanical stabilization layer 1520.

The number of electrically conductive layers 1510 and the number of mechanical stabilization layers 1520 may be equal to or greater than 3 or 4 or 5 or 6 or 7 or 8, respectively. Some or each of the electrically conductive layers 1510 may have a thickness in a range between 100 nm and 400 nm. Some or each of the mechanical stabilization layers 1520 may have a thickness in a range between 10 nm and 40 nm.

The division of the "thick" electrically conductive layer 1410 of the multilayer layer stack 1400 into multiple thinner layers 1510 results in a reduction in grain size in the material of the electrically conductive layer 1510 compared to the electrically conductive layer 1410. The reduction in grain size increases the yield strength of the electrically conductive layer 1510, resulting in a later onset of plastic deformation. In addition, TiN increases the overall stiffness of the multilayer stack 1500 due to its larger elastic modulus.

In an experimental setup, a multilayer stack 1400 of TiW/Cu/TiW of thicknesses 150 nm/2000 nm/150 nm was used.

Figure 16:
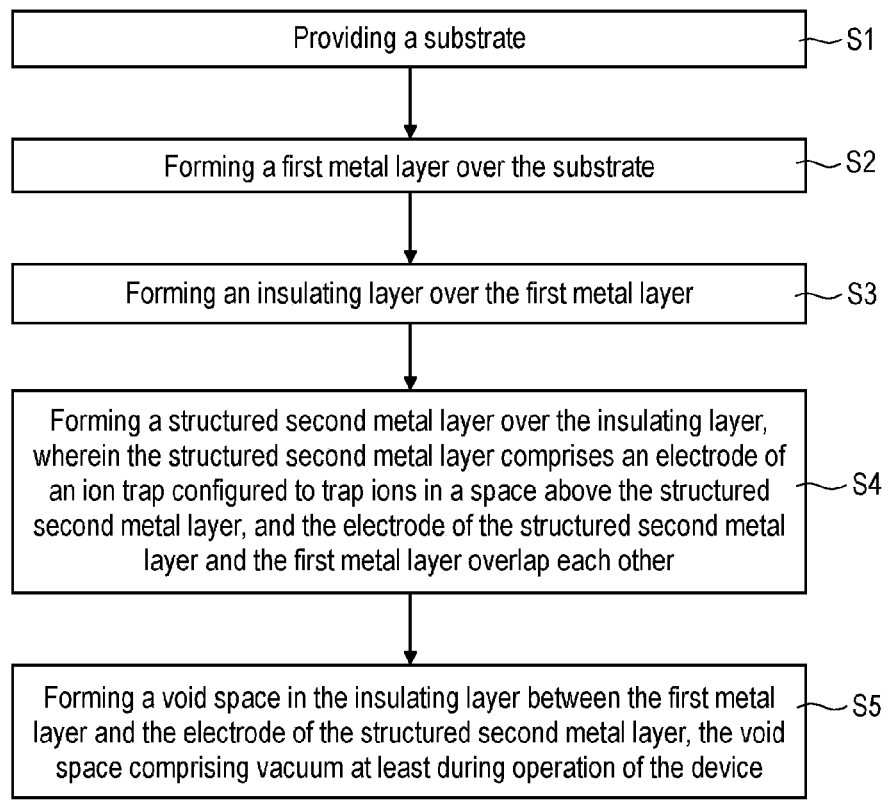
FIG. 16 is a flowchart illustrating exemplary stages of a method of manufacturing a device for controlling trapped ions.

Referring to FIG. 16, an exemplary method of manufacturing a device for controlling trapped ions may include, at stage S1, providing a substrate. The substrate may, e.g., be a wafer of one of the aforementioned materials.

At S2 a first metal layer is formed over the substrate. Microfabrication techniques may be used for deposition and structuring of the first metal layer, if appropriate.

At S3 an insulating layer is formed over the first metal layer. As described above, formation of the insulating layer may comprise forming a dielectric layer of a first dielectric material and structuring the dielectric layer to comprise a pattern either of a second dielectric material or of a sacrificial material. Further, the insulating layer may be formed and structured to comprise regions of a porous dielectric material.

At S4 a structured second metal layer is formed over the insulating layer. The structured second metal layer comprises an electrode of an ion trap configured to trap ions in a space above the structured second metal layer. The electrode of the structured second metal layer and the first metal layer overlap each other (in a vertical projection).

At S5 a void space is formed in the insulating layer between the first metal layer and the electrode of the structured second metal layer. The void space is designed to comprise a vacuum at least during operation of the device. That way, the overlap area of the first metal layer and the structured second metal layer in the insulating layer is reshaped to have lower dielectric losses and lower capacitance.

The following examples pertain to further aspects of the disclosure:

Example 1 is a device for controlling trapped ions. The device includes a substrate. A first metal layer is disposed over the substrate. An insulating layer is disposed over the first metal layer. A structured second metal layer is disposed over the insulating layer. The structured second metal layer comprises an electrode of an ion trap configured to trap ions in a space above the structured second metal layer. The electrode of the structured second metal layer and the first metal layer overlap each other. The device further comprises a void space in the insulating layer between the first metal layer and the electrode of the structured second metal layer, the void space comprising a vacuum at least during operation of the device.

In Example 2, the subject matter of Example 1 can optionally include a support structure arranged in the void space for supporting the electrode of the structured second metal layer.

In Example 3, the subject matter of Example 2 can optionally include wherein the support structure comprises an array of pillars.

In Example 4, the subject matter of Example 2 or 3 can optionally include wherein the insulating layer comprises a dielectric material, the void space is formed in the dielectric material and the support structure is of the dielectric material.

In Example 5, the subject matter of Example 2 or 3 can optionally include wherein the insulating layer comprises a first dielectric material and a second dielectric material, the void space is formed in the first dielectric material and the support structure is of the second dielectric material.

In Example 6, the subject matter of Example 5 can optionally include wherein the first dielectric material is silicon oxide and the second dielectric material is silicon nitride.

In Example 7, the subject matter of Example 6 can optionally include wherein at least one of the first metal layer and the structured second metal layer is provided with one or a plurality of holes communicating with the void space.

In Example 8, the subject matter of any preceding Example can optionally include wherein the support structure is formed of a porous dielectric material.

In Example 9, the subject matter of any preceding Example can optionally include wherein the electrode of the structured second metal layer is an RF electrode of the ion trap.

In Example 10, the subject matter of any preceding Example can optionally include wherein the structured second metal layer is formed of a multilayer stack, wherein the multilayer stack comprises an electrically conductive layer of a first material and a mechanical stabilization layer of a second material, the second material having an elastic modulus greater than the elastic modulus of the first material and/or the second material having a yield strength greater than the yield strength of the first material.

In Example 11, the subject matter of any preceding Example can optionally include a further substrate disposed over and spaced apart from the substrate; and a structured third metal layer disposed at a main side of the further substrate opposite the structured second metal layer, the structured third metal layer forms electrodes of the ion trap, the ion trap being configured to trap ions in a space between the structured second metal layer and the structured third metal.

Example 12 is a method of manufacturing a device for controlling trapped ions. The method may include providing a substrate; forming a first metal layer over the substrate; forming an insulating layer over the first metal layer; forming a structured second metal layer over the insulating layer, wherein the structured second metal layer comprises an electrode of an ion trap configured to trap ions in a space above the structured second metal layer, and the electrode of the structured second metal layer and the first metal layer overlap each other; and forming a void space in the insulating layer between the first metal layer and the electrode of the structured second metal layer, the void space being filled by a vacuum at least during operation of the device.

In Example 13, the subject matter of Example 12 can optionally include forming a support structure in the void space for supporting the electrode of the structured second metal layer.

In Example 14, the subject matter of Example 13 can optionally include wherein forming the void space and forming the support structure comprises: forming the insulating layer of a dielectric material; forming one or a plurality of holes in the first metal layer and/or the structured second metal layer; and etching the dielectric material by introducing an etchant through the one or the plurality of holes to form the void space in the dielectric material, with non-etched away dielectric material serving as the support structure.

In Example 15, the subject matter of Example 13 can optionally include wherein forming the void space and forming the support structure comprises: forming the insulating layer to comprise a pattern of a first dielectric material and a second dielectric material; and applying an etchant to the insulating layer to form the void space in the first dielectric material, the second dielectric material being resistant to the etchant to serve as the support structure.

In Example 16, the subject matter of Example 13 can optionally include wherein forming the void space and forming the support structure comprises: forming the insulating layer to comprise a pattern of a dielectric material and a sacrificial material; and applying an etchant to the insulating layer to remove the sacrificial material to form the void space, the dielectric material being resistant to the etchant to serve as the support structure.

In Example 17, the subject matter of Example 16 can optionally include wherein the sacrificial material is a carbon-based material.

In Example 18, the subject matter of Example 13 can optionally include wherein forming the void space and forming the support structure comprises: forming the insulating layer to comprise a porous dielectric material, the porous dielectric material simultaneously forming the void space and the support structure.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A device for controlling trapped ions, the device comprising:
    a substrate;
    a first metal layer disposed over the substrate;
    an insulating layer disposed over the first metal layer; and
    a structured second metal layer disposed over the insulating layer, the structured second metal layer comprising an electrode of an ion trap configured to trap ions in a space above the structured second metal layer, the electrode of the structured second metal layer and the first metal layer overlapping each other; and
    a void space in the insulating layer between the first metal layer and the electrode of the structured second metal layer, the void space comprising a vacuum at least during operation of the device.

2. The device of claim 1, further comprising:
    a support structure arranged in the void space for supporting the electrode of the structured second metal layer.

3. The device of claim 2, wherein the support structure comprises an array of pillars.

4. The device of claim 2, wherein the insulating layer comprises a dielectric material, and wherein the void space is formed in the dielectric material and the support structure is of the dielectric material.

5. The device of claim 2, wherein the insulating layer comprises a first dielectric material and a second dielectric material, and wherein the void space is formed in the first dielectric material and the support structure is of the second dielectric material.

6. The device of claim 5, wherein the first dielectric material is silicon oxide and the second dielectric material is silicon nitride.

7. The device of claim 2, wherein the support structure is formed of a porous dielectric material.

8. The device of claim 1, wherein at least one of the first metal layer and the structured second metal layer is provided with one or a plurality of holes communicating with the void space.

9. The device of claim 1, wherein the electrode of the structured second metal layer is an RF electrode of the ion trap.

10. The device of claim 1, wherein the structured second metal layer is formed of a multilayer stack, wherein the multilayer stack comprises an electrically conductive layer of a first material and a mechanical stabilization layer of a second material, and wherein the second material has an elastic modulus greater than the elastic modulus of the first material and/or the second material has a yield strength greater than the yield strength of the first material.

11. The device of claim 1, further comprising:
    a further substrate disposed over and spaced apart from the substrate; and
    a structured third metal layer disposed at a main side of the further substrate opposite the structured second metal layer,
    wherein the structured third metal layer forms electrodes of the ion trap,
    wherein the ion trap is configured to trap ions in a space between the structured second metal layer and the structured third metal layer.

12. A method of manufacturing a device for controlling trapped ions, the method comprising:
    providing a substrate;
    forming a first metal layer over the substrate;
    forming an insulating layer over the first metal layer;
    forming a structured second metal layer over the insulating layer, the structured second metal layer comprising an electrode of an ion trap configured to trap ions in a space above the structured second metal layer, the electrode of the structured second metal layer and the first metal layer overlapping each other; and
    forming a void space in the insulating layer between the first metal layer and the electrode of the structured second metal layer, the void space comprising a vacuum at least during operation of the device.

13. The method of claim 12, further comprising:
forming a support structure in the void space for supporting the electrode of the structured second metal layer.

14. The method of claim 13, wherein forming the void space and forming the support structure comprises:
forming the insulating layer of a dielectric material;
forming one or a plurality of holes in the first metal layer and/or the structured second metal layer; and
etching the dielectric material by introducing an etchant through the one or the plurality of holes to form the void space in the dielectric material, with non-etched away dielectric material serving as the support structure.

15. The method of claim 13, wherein forming the void space and forming the support structure comprises:
forming the insulating layer to comprise a pattern of a first dielectric material and a second dielectric material; and
applying an etchant to the insulating layer to form the void space in the first dielectric material, the second dielectric material being resistant to the etchant to serve as the support structure.

16. The method of claim 13, wherein forming the void space and forming the support structure comprises:
forming the insulating layer to comprise a pattern of a dielectric material and a sacrificial material; and
applying an etchant to the insulating layer to remove the sacrificial material to form the void space, the dielectric material being resistant to the etchant to serve as the support structure.

17. The method of claim 16, wherein the sacrificial material is a carbon-based material.

18. The method of claim 13, wherein forming the void space and forming the support structure comprises:
forming the insulating layer to comprise a porous dielectric material, the porous dielectric material simultaneously forming the void space and the support structure.

* * * * *